United States Patent Office
3,419,503
Patented Dec. 31, 1968

3,419,503
ACTIVATING A COMPOSITE CATALYST WITH HCl PRIOR TO A CARBON CHLORIDE TREATMENT
Joseph P. Giannetti, Allison Park, Alfred M. Henke, Springdale Township, Allegheny County, and Raynor T. Sebulsky, Verona, Pa., assignors to Gulf Research & Development Company, Pittsburgh, Pa., a corporation of Delaware
No Drawing. Filed June 30, 1966, Ser. No. 561,710
9 Claims. (Cl. 252—441)

ABSTRACT OF THE DISCLOSURE

A composite catalyst of alumina and a hydrogenating metal is treated initially with hydrogen chloride and then treated with a carbon chloride, such as $CCl_4$, $CHCl_3$, $CH_2Cl_2$, $CCl_2F_2$, etc. to increase the halogen content of the catalyst. The catalyst activated by these steps provides a highly active, low temperature isomerization catalyst.

---

This invention relates to the preparation of novel, low temperature isomerization catalyst compositions and to the use thereof for the isomerization of relatively unbranched hydrocarbons to more highly branched forms.

Compounds with the general formula

wherein X and Y may each be a monovalent radical of either hydrogen, halogen or SCl, or where X and Y taken together may be divalent oxygen or sulfur may be employed as activation agents or catalytic materials comprising alumina and a metalliferous hydrogenating component. The resulting catalyst has activity in the low temperature isomerization of normal paraffins to their respective isomers so as to produce relatively high yields.

It has now been found that the activity of such catalysts may be enhanced by pretreating the catalysts with a hydrogen-hydrogen chloride mixture to improve their susceptibility to activation with a carbon chloride. It has further been found that the activity of such catalysts can be still further enhanced by subjecting the pretreated, activated catalysts to further after-treatment with hydrogen chloride.

In accordance with the present invention, a composite catalytic material comprising a major proportion of alumina and containing a minor proportion of a metalliferous material having hydrogenating activity, such as platinum metal, is activated for isomerization of hydrocarbons by a combination of treating steps involving first, pretreatment of the composite catalyst to improve its susceptibility to activation with a carbon chloride by contact thereof with hydrogen chloride, preferably in admixture with hydrogen, at a temperature in the range of about 950° to 1250° F., preferably from about 1000° to about 1100° F., and second, activating the pretreated catalyst by contracting the same with a carbon chloride at nonreducing conditions at an elevated temperature, for example, from about 200° to about 1000° F., preferably from about 325° to about 800° F., effective to promote a substantial increase in the chlorine content of said composite material.

Suitable carbon chloride activation compounds include carbon tetrachloride, chloroform ($CHCl_3$), methylene chloride ($CH_2Cl_2$), dichlorodifluromethane ($CCl_2F_2$), trichlorobromomethane ($CCl_3Br$), thiocarbonyltetrachloride ($CCl_3SCl$), trichlorofluoromethane ($CCl_3F$), dichlorodibromomethane ($CCl_2Br$), and dichlorobromofluoromethane ($CCl_2BrF$). However, any compound having the general formula $CCl_2XY$, where X or Y may be a monovalent radical of either hydrogen, halogen or SCl, or where X and Y taken together may be oxygen or sulfur, may be employed for the activation of the alumina catalysts of the present invention.

Composite catalytic materials that have been pretreated and activated in the manner indicated above are highly effective as low temperature isomerization catalysts for paraffinic hydrocarbons, but especially advantageous results are obtained when the above-indicated pretreating and activating treatments are followed by a further activating treatment with hydrogen chloride at a temperature in the range of from about 60° to about 900° F., preferably from about 325° to 800° F. The present invention therefore includes not only the combination of the hydrogen chloride pretreatment, activation with a carbon chloride, and the hydrogen chloride aftertreatment, but also the subcombination of a hydrogen chloride pretreatment and activation with a carbon chloride, as well as catalysts prepared by the indicated combination or subcombination of treating steps, and a method of isomerizing hydrocarbons with catalysts prepared by either the indicated combination or subcombination of treating steps.

The hydrogen chloride pretreatment of the composite catalytic material can be carried out under any conditions effective to remove at least a portion of the water not previously removed during calcining and drying of the composite catalytic material and that will not adversely affect the catalytic activity of the catalyst by fusion. Temperatures in the range of from about 950° to 1250° F., preferably from about 1000° to about 1100° F., are normally effective for this purpose. Temperatures significantly less than about 950° F. should not be used for purposes of the present invention, since such lower temperatures are relatively less effective to enhance the susceptibility of the catalyst base to activation with a carbon chloride. The water which is removed during the pretreatment can be physically adsorbed water, chemically or pseudochemically bound water, such as water of hydration or water formed by the reaction of hydroxyl groups present on the surface of the alumina.

The hydrogen chloride employed in the pretreating step can be used in any proportion with respect to the composite catalytic material that is effective to increase the chlorine content of such material, as even a small increase in the chlorine content of such material obtained in this fashion will effectively increase the isomerization catalytic activity obtainable by the subsequent treatment with a carbon chloride. It is preferred to employ hydrogen chloride in substantial excess of the amount that is capable of combining with the composite catalytic material at the reaction conditions employed. Excellent results are obtainable by the use of hydrogen chloride in proportions of from about 0.1 to about 1:1 by weight with respect to the catalyst, but larger or smaller proportions can also be used with good results. The action of the hydrogen chloride upon the composite catalytic material takes place easily at atmospheric pressures, and elevated pressures are not necessary, although such pressures can be used if desired.

The hydrogen utilized in the hydrogen-hydrogen chloride pretreatment may be employed in a ratio of from about 1:1 to about 10:1 by volume with the hydrogen chloride.

The hydrogen chloride pretreatment described above, can be carried out for as little as a few minutes, since some hydrogen chloride can combine with the catalyst even when only a small amount of water is removed from the composite catalytic material, but it is preferred to continue the hydrogen chloride treatment until no further evolution of water can be observed and until no further combination of hydrogen chloride with the catalyst is obtained at the reaction conditions selected. Normally this point will have been reached before about 3 hours at the temperatures indicated, and no further advantage is obtained by longer periods of the hydrogen chloride treatment, although the pretreatment has been successfully carried out for as long as 6 hours.

The hydrogen chloride utilized in the pretreating operation need not be pure and can contain other materials that do not adversely affect the isomerization activity of the finished catalyst. In fact, it is preferred to employ a diluent gas, such as hydrogen, in a ratio of about 1:1 to 10:1 by volume with the hydrogen chloride. Inert diluent gases, such as nitrogen, can also be used in the same or other proportions. Moreover, the hydrogen chloride need not be employed as such but can be introduced in the form of a hydrogen chloride precursor, such as propyl chloride, t-butyl chloride or other chlorine-substituted aliphatic hydrocarbon, when hydrogen is used as the diluent gas.

As indicated previously, the carbon chloride treatment of the catalyst base is carried out under nonreducing conditions effective to promote a substantial increase in the chlorine content of the catalyst base. The use of nonreducing conditions is important as reducing conditions may lead to formation of hydrogen chloride, which in turn will reduce the effective amount of chlorine available to combine with the catalyst base. The nonreducing conditions can be achieved merely by exclusion from the reaction zone of materials other than the catalyst base and the carbon chloride. Alternatively, the carbon chloride can be contacted with the catalyst base, together with an inert carrier gas such as nitrogen, or with an oxidizing gas such as air or oxygen.

By "nonreducing conditions" is meant merely essentially nonreducing conditions. Accordingly, conditions under which a small proportion of a reducing component such as hydrogen is present are not intended to be excluded.

The carbon chloride may be contacted with the hydrogen-hydrogen chloride-treated catalyst base in any proportions and under any conditions sufficient to substantially increase the chlorine content of the catalyst base. Proportions sufficient to increase the chlorine content of the catalyst base by about 1 percent under the reaction conditions employed will produce an appreciable improvement in the activity of the catalyst, but we prefer to utilize larger proportions sufficient to increase the chlorine content of the catalyst by at least about 1.5 and preferably up to about 8 percent by weight. However, still larger proportions can be used; for example, there can be used amounts sufficient to yield up to 10 to 12 percent chlorine in the catalyst base without undue difficulties. Within the limits indicated, the use of a carbon chloride in weight ratios of from about 0.02 to about 2.0, and preferably from about 0.05 to about 1 with respect to the catalyst base, are effective at the conditions disclosed herein to achieve the desired results.

The carbon chloride interacts with the catalyst base most readily at elevated temperatures. Very active catalysts are obtained when using treating tempeatures in the range of from about 325° to about 800° F., but higher or lower temperatures can be used. For example, temperatures as low as about 200° F. are effective to promote the desired interaction. The treating temperature should not exceed about 1000° F., to avoid unnecessarily reducing the amount of chlorine combined with the catalyst base. Within the temperature ranges disclosed, contact times of from about 15 minutes to about 5 hours, preferably from about 0.5 to about 3 hours, are effective to increase the chlorine content of the catalyst base to a satisfactory level for purposes of this invention.

It is presumed that the chlorine portion of the carbon chloride interacts chemically in some not fully understood way with the catalyst base. Available evidence indicates that the nature of the reaction is unique, as catalysts prepared in the manner disclosed herein have been found markedly superior to comparable catalysts in which the chlorine content of the catalyst is increased, for example, by treatment with vaporous aluminum chloride.

While it is not intended to limit this invention to any particular theory, the following general reactions appear to take place:

(a) $2{>}Al{-}OH + CCl_4 \rightarrow 2{>}Al{-}Cl + COCl_2 + H_2O$
(b) Formation of a Pt—Cl—Al complex.

The catalyst activated as described above can be used, as such, for low temperature isomerization of paraffinic hydrocarbons, or they may be further subjected to a further activity promoting aftertreatment with hydrogen chloride, as previously indicated.

The hydrogen chloride aftertreatment can be carried out at any conditions that will not significantly reduce the chlorine content of the previously activated catalyst. Temperatures in the range of from about 60° to about 900° F., preferably in the range of from about 325° to about 800° F., can be used. While some effect of the hydrogen chloride aftertreatment may be noted at temperatures below about 60° F., the temperature of the hydrogen chloride aftertreatment should not be significantly above about 900° F.

It is preferred to employ the hydrogen chloride in excess of the amount that will combine with the activated catalyst at the conditions of treatment, but smaller amounts can be used. By way of illustration, excellent results are obtainable by the use of hydrogen chloride in proportions of about 0.1 to 1:1 by weight with respect to the activated catalyst.

Similarly, as in the case of the hydrogen chloride pretreatment, the hydrogen chloride aftertreatment can be carried out at ambient atmospheric pressures, and elevated pressures are not necessary, although such pressures can be used. Also as in the case of the hydrogen chloride pretreatment the contact with hydrogen chloride can be effected over a period of a few minutes to several hours with good results. If desired, the hydrogen chloride aftertreatment can be carried out before or during contact of the catalyst with a hydrocarbon feed to be isomerized. No significant additional advantages are observed from carrying out the hydrogen chloride aftertreatment beyond 3 hours, although longer treating periods can be used successfully.

Further, as in the case of the hydrogen chloride pretreatment, the hydrogen chloride need not be pure and may contain as a diluent in anly proportion hydrogen gas or inert diluent gases such as nitrogen and the like. By way of illustration, good results are obtainable when hydrogen is employed in proportions of from about 1:1 to about 10:1 by volume with respect to the hydrogen chloride.

The composite catalysts from which the activated catalysts of this invention are derived can comprise any form of porous alumina suitable for use as a catalytic agent or support. For example, excellent results are obtainable with aluminas prepared by calcining a beta-alumina trihydrate such as bayerite or mixtures thereof with other alumina hydrates, but aluminas prepared by calcining other hydrated aluminas, such as the amorphous alumina formed by hydrolysis of aluminum methoxide, or crystallized alumina hydrates, such as alpha-alumina trihydrate or gibbsite, or naturally occurring materials containing the same, such as bauxite, "new" beta-alumina trihydrate or nordstrandite, and alpha-and beta-alumina monohydrate such as boehmite and diaspore, or various combinations of any of these can be used. Also, there can be used the aluminas described in copending patent applications Ser. Nos. 118,240, 118,241 and 118,279, filed June 20, 1961, in the names of William L. Kehl and Meredith M. Stewart, which aluminas are prepared by calcining an alumina hydrate containing 1.2 to 2.6 mols of water of hydration.

The alumina bases useful in the present invention can be essentially pure alumina as is preferred, or they can contain small amounts, up to about 45 percent of other refractory oxides, such as silica, beryllia, titania, zirconia or boria. Such aluminas are generally characterized by a high surface area, commonly ranging from about 200 to 500 m.$^2$/g. or even more.

Especially advantageous results are obtainable when using aluminas having a surface area above about 250 m.$^2$/g., and more particularly, above 300 m.$^2$/g., although aluminas of lower surface area can be used. Presumably, the amount of chlorine that can be taken up during the carbon chloride treatment is a function of the surface area that can be contacted thereby, although available experimental evidence indicates that the amount of chlorine taken up is not necessarily limited by surface area.

The catalyst bases or precursors from which the activated catalysts of this invention are prepared are composited with a small proportion of at least one metalliferous component, having hydrogenating activity and selected from the left-hand column of Group VI or from Group VIII of Mendelyeev's Periodic Table. Examples of suitable materials are platinum, rhodium, palladium, nickel and tungsten. Especialy good results are obtainable with platinum and palladium. In general, the hydrogenating component will be present in amounts in the range of from about 0.01 to about 5.0 percent by weight of the catalyst, and preferably from about 0.1 to about 2.5 percent, particularly in the case of noble metal components. By way of example, excellent results are obtainable with 0.2 and 0.7 percent platinum or 1 percent palladium on alumina.

The hydrogenating component can be composited with the alumina in any convenient way. Thus, the hydrogenating component can be deposited on a precalcined alumina support in the form of a water solution of a water-soluble salt, following which the wetted base can be calcined. Examples of such solutions are solutions containing chloroplatinic acid or other halogen platinum acids, or water solutions of nickel and tungsten nitrate in the desired proportion with respect to one another. Alternatively, the hydrogenating component can be added as a salt to the alumina hydrate and then precipitated with a substance such as hydrogen sulfide and calcining, or calcining alone. Additionally, an aqueous metal sulfide sol, for example, a platinum sulfide sol, can be used to impregnate an alumina hydrate or admixed with an alumina solution prior to drying and calcining.

Regardless of the method of compositing the starting catalyst base, the noble metal hydrogenating components are advantageously converted to a reduced form prior to the pretreatment with hydrogen chloride or the activation treatment with carbon chloride, so as to minimize loss of the hydrogenating component by formation of volatile complexes during carbon chloride treatment. In the case of base metals such as nickel and tungsten, the hydrogenating component can remain in the form of a sulfide or oxide prior to the hydrogen chloride pretermined and the carbon chloride activation treatment.

It is also important that the hydrogenating component be composited with the alumina base before the hydrogen chloride pretreatment and the carbon chloride activation treatment, as deposition thereafter normally will result in a reduction of the chlorine content of the carbon chloride treated base. This is undesirable, as the activity of the herein-disclosed catalyst appears to be generally related to the increase in chlorine content attributable to the carbon chloride activation treatment.

The catalyst base can contain halogen other than that incorporated by the carbon chloride treatment. For example, some halogen content may result from the use of an aluminum halide as a starting material to form the alumina base and/or some halogen may remain in the catalyst owing to the use of a halogen-noble metal acid. However, the halogen content from such sources as these does not appear to be equivalent, for purposes of this invention, to the halogen content resulting from the hydrogen chloride and carbon chloride treatments.

Catalysts that have been activated by the combination or subcombination activating processes described herein are useful in the low temperature isomerization of isomerizable saturated hydrocarbons, including not only straight-chain and slightly branched paraffins such as n-butane, n-pentane and n-hexane, but also cycloparaffins such as cyclopentane and cyclohexane and their corresponding methyl- and dimethyl-substituted derivatives. These compounds need not be pure but can be mixed with other hydrocarbon materials as in the case of fractions obtained by fractional distillation of gasoline and naphtha cuts obtained from crude oils of reforming, for example. The process is especially advantageous for vapor phase isomerization of straight chain paraffin hydrocarbons containing 4 to 6 carbon atoms.

When the isomerization feed stock is derived from crude oil, the sulfur content may be so high as detrimentally to affect the catalyst. In such instances, it may be desirable to desulfurize the feed prior to isomerization in conventional manner, preferably by treatment with a suitable desulfurizing catalyst in the presence of hydrogen at elevated temperature and pressure. Desulfurization is especially important when the hydrogenating metal component of the herein-disclosed catalysts is sensitive to sulfur, as in the case of platinum.

Isomerization of the herein-disclosed feed stocks with the herein-disclosed catalysts is carried out at low temperatures in the range of from about 75° F. to about 450° F. in the presence of hydrogen gas at a pressure of from about atmospheric to about 2000 p.s.i.g., preferably from about 50 to about 1200 p.s.i.g., using a hydrogen:hydrocarbon mol ratio in the range of from about 0 to about 10:1, preferably from about 0.1 to about 5:1. Space velocities of from about 0.3 to about 10 and preferably from about 0.5 to about 5 volumes of liquid feed per hour per volume of catalyst can be used in continuous processes. The hydrogen is effective to saturate unsaturated bonds and to suppress cracking. The desired hydrogen:hydrocarbon ratio and hydrogen pressure are advantageously maintained in a continuous process by recycling gases separated from the isomerized hydrocarbon product.

The term "halogen" as used herein is intended to include chlorine, bromine, iodine and fluorine.

The invention may be best understood by reference to the following specific examples which are illustrative only and are not intended to be limiting as to scope. All of the percentages indicated are by weight, unless otherwise specified.

EXAMPLE 1

A commercial naphtha reforming catalyst in the amount of about 126 grams containing 0.6 percent platinum on an alumina base, having a typical chlorine content of 0.6 percent chlorine and a typical surface area of about 425 m.$^2$/g. is calcined at 550° F. overnight and at 900° F. for 2 hours. This catalyst is reduced in a stream of hydrogen at 900° F. for 2 hours. The hydrogen flow rate utilized is 1.5 standard cubic feet per hour. The reduced catalyst is purged over a period of 6 hours in a flow of prepurified nitrogen.

The temperature of the catalyst is then raised to 1050° F. and the catalyst is subjected to a concurrent pretreatment with hydrogen at a flow rate of 1.5 standard cubic feet per hour and with 15 grams of hydrogen chloride per hour over a period of 3 hours.

The temperature is then reduced to 560° F. and 35 grams of carbon tetrachloride (CCl$_4$) is passed over the catalyst in about one hour with a nitrogen carrier gas.

The temperature is then further reduced to 400° F. and hydrogen chloride at the rate of 15 grams per hour is passed over the catalyst over a period of 3 hours. The resulting catalyst contains about 4.8 percent chlorine.

EXAMPLE 2

The catalyst prepared by the method of Example 1 is tested for the conversion of normal butane by passing a normal butane feed stock to a reaction zone containing the said catalyst at a temperature of 325° F., a pressure of 800 p.s.i.g., and a liquid hourly space velocity of one. Hydrogen is concurrently employed with the normal butane in a molar ratio of 2.5 moles of hydrogen per mole of normal butane.

An analysis of the product stream indicates that 43 percent by weight of the normal butane is converted to isobutane.

The following example illustrates the effect on normal butane conversion of omitting the hydrogen chloride aftertreatment:

EXAMPLE 3

A reduced catalyst prepared by the method of Example 1, except that the hydrogen chloride aftertreatment is omitted, is placed in a reaction zone. A normal butane feed is passed over this catalyst at a temperature of 325° F., a pressure of 800 p.s.i.g. and a liquid hourly space velocity of one. A hydrogen to normal butane molar ratio of 2.5 to 1 is employed.

A product analysis indicates a conversion of normal butane to isobutane of 38 percent.

The following example illustrates the effect on normal butane conversion of omitting both the hydrogen-hydrogen chloride pretreatment and the hydrogen chloride aftertreatment:

EXAMPLE 4

The isomerization process of the previous examples was repeated using the identical conditions therein, and a catalyst prepared by the method of Example 1, except that both the hydrogen-hydrogen chloride pretreatment and the hydrogen chloride aftertreatment are omitted—i.e., the reduced catalyst is activated with carbon tetrachloride, alone.

A conversion to isobutane of only 20 percent by weight of the normal butane feed is realized.

A platinum on alumina catalyst of the type disclosed in Example 1, but which is not activated, is essentially incapable of isomerizing normal butane to isobutane under the isomerization conditions of the foregoing examples. While the use of a carbon chloride, e.g. CCl₄, activating agent will permit a conversion of normal butane to isobutane of 20 percent, the employment of a hydrogen-hydrogen chloride pretreatment prior to the carbon chloride activation step according to this invention, with or without a hydrogen chloride aftertreatment, will practically double the conversion achieved.

Obviously, many modifications and variations of the invention as hereinabove set forth can be made without departing from the spirit and scope thereof, and therefore only such limitations should be imposed as are indicated in the appended claims.

We claim:

1. The method of activating a composite catalyst comprising a major proportion of alumina and containing a minor proportion of metalliferous material having hydrogenating activity, comprising pretreating said composite material with hydrogen chloride to improve its susceptibility for activation with a carbon chloride, activating the pretreated material by contact with a carbon chloride having the generic formula

wherein X and Y may be the same or different groups and when taken individually are selected from the group consisting of hydrogen, halogen and SCl, and when taken together are selected from the group consisting of oxygen and sulfur, said contacting being conducted at nonreducing conditions at a temperature effective to promote a substantial increase in the chlorine content of the catalyst.

2. The method of claim 1 wherein the pretreating is conducted at a temperature in the range of from about 950° to about 1250° F.

3. The method of claim 1 wherein the carbon chloride activation is conducted at a temperature in the range of from about 200° to about 1000° F.

4. The method of claim 1 wherein the carbon chloride is carbon tetrachloride.

5. The method of claim 1 wherein the metalliferous material is platinum in reduced form.

6. The method of claim 1 wherein the carbon chloride activated catalyst is subjected to a hydrogen chloride post treatment.

7. The method of claim 6 wherein the hydrogen chloride post treatment is conducted at a temperature in the range of from about 60° to about 900° F.

8. The method of claim 1 wherein the alumina has a surface area of more than about 250 square meters per gram.

9. The method of claim 6 wherein the hydrogen chloride for the post treatment is supplied with a hydrocarbon isomerization feed stock.

References Cited

UNITED STATES PATENTS

| | | | |
|---|---|---|---|
| 2,915,571 | 12/1959 | Haensel | 260—683.68 |
| 2,944,097 | 7/1960 | Starnes et al. | 260—683.68 |
| 2,944,098 | 7/1960 | Fogle et al. | 260—683.68 |
| 3,078,323 | 2/1963 | Kline et al. | 260—683.68 |
| 3,105,859 | 10/1963 | Fogle et al. | 260—683.68 |
| 3,242,228 | 3/1966 | Riordan et al | 260—683.68 |
| 3,287,439 | 11/1966 | Suggitt et al. | 260—683.68 |
| 3,322,689 | 5/1967 | Giannetti et al. | 260—683.68 |

DELBERT E. GANTZ, *Primary Examiner.*

G. J. CRASANAKIS, *Assistant Examiner.*

U.S. Cl. X.R.

252—411; 260—683.68